US012778205B2

(12) United States Patent
Lu et al.

(10) Patent No.: US 12,778,205 B2
(45) Date of Patent: Nov. 3, 2026

(54) VAPORIZER, ELECTRONIC VAPORIZATION DEVICE, AND SEAL ELEMENT FOR VAPORIZER

(71) Applicant: SHENZHEN FIRST UNION TECHNOLOGY CO., LTD., Shenzhen City (CN)

(72) Inventors: Linhai Lu, Shenzhen City (CN); Zhongli Xu, Shenzhen City (CN); Yonghai Li, Shenzhen City (CN)

(73) Assignee: SHENZHEN FIRST UNION TECHNOLOGY CO., LTD., Shenzhen City (CN)

( * ) Notice: Subject to any disclaimer, the term of this patent is extended or adjusted under 35 U.S.C. 154(b) by 449 days.

(21) Appl. No.: 18/283,812

(22) PCT Filed: Mar. 24, 2022

(86) PCT No.: PCT/CN2022/082850
§ 371 (c)(1),
(2) Date: Sep. 24, 2023

(87) PCT Pub. No.: WO2022/199667
PCT Pub. Date: Sep. 29, 2022

(65) Prior Publication Data

US 2024/0164451 A1 May 23, 2024

(30) Foreign Application Priority Data

Mar. 24, 2021 (CN) ......................... 202120601053.4
Apr. 29, 2021 (CN) ......................... 202120918343.1

(51) Int. Cl.
*A24F 40/485* (2020.01)
*A24F 40/10* (2020.01)
(Continued)

(52) U.S. Cl.
CPC ............ *A24F 40/485* (2020.01); *A24F 40/10* (2020.01); *A24F 40/42* (2020.01); *F16J 15/06* (2013.01)

(58) Field of Classification Search
CPC ........ A24F 40/485; A24F 40/10; A24F 40/42; A24F 40/30
See application file for complete search history.

(56) References Cited

U.S. PATENT DOCUMENTS

2016/0029699 A1 2/2016 Li et al.
2017/0280778 A1* 10/2017 Force ...................... A24F 40/42
2017/0283154 A1* 10/2017 Karles .................... B65D 81/32

FOREIGN PATENT DOCUMENTS

CN 202197836 U 4/2012
CN 106805296 A 6/2017
(Continued)

*Primary Examiner* — Michael H. Wilson
*Assistant Examiner* — Daniel Edward Vakili
(74) *Attorney, Agent, or Firm* — Scully, Scott, Murphy & Presser, P.C.

(57) ABSTRACT

This application provides a vaporizer, an electronic vaporization device, and a seal element for a vaporizer. The vaporizer includes: a liquid storage cavity; a vaporization assembly, configured to vaporize a liquid substrate to generate an aerosol; a liquid channel, configured to provide a flowing path for the liquid substrate in the liquid storage cavity to flow to the vaporization assembly; and a seal element, including a blocking portion configured to seal the liquid channel and at least one weak region. The at least one weak region is constructed to be ruptured or broken, thereby releasing the seal of the liquid channel. Before use of the vaporizer, the liquid channel is sealed by the seal element to prevent the liquid substrate from being provided to the vaporization assembly; and in use, the liquid channel is unblocked by rupturing or breaking the weak region of the seal element.

19 Claims, 10 Drawing Sheets

(51) Int. Cl.
*A24F 40/42* (2020.01)
*F16J 15/06* (2006.01)

(56) References Cited

FOREIGN PATENT DOCUMENTS

| | | | |
|---|---|---|---|
| CN | 112353008 | A | 2/2021 |
| CN | 212590248 | U | 2/2021 |
| CN | 215347029 | U | 12/2021 |

* cited by examiner

VAPORIZER, ELECTRONIC VAPORIZATION DEVICE, AND SEAL ELEMENT FOR VAPORIZER

CROSS-REFERENCE TO RELATED APPLICATIONS

This application is a 35 U.S.C. § 371 National Phase conversion of International PCT) Patent Application No. PCT/CN2022/082850, filed on Mar. 24, 2022. The above mentioned PCT international patent application claims priority to Chinese Patent Application No. 202120601053.4, filed with the China National Intellectual Property Administration on Mar. 24, 2021 and entitled "VAPORIZER, ELECTRONIC VAPORIZATION DEVICE, AND SEAL ELEMENT FOR VAPORIZER", which is incorporated herein by reference in its entirety.

The above mentioned PCT international patent application also claims priority to Chinese Patent Application No. 202120918343.1, filed with the China National Intellectual Property Administration on Apr. 29, 2021 and entitled "VAPORIZER, ELECTRONIC VAPORIZATION DEVICE, AND SEAL ELEMENT FOR VAPORIZER", which is incorporated herein by reference in its entirety. The PCT International Patent Application was filed and published in Chinese.

TECHNICAL FIELD

Embodiments of this application relate to the field of electronic vaporization technologies, and in particular, to a vaporizer, an electronic vaporization device, and a seal element for a vaporizer.

BACKGROUND

Tobacco products (such as cigarettes, cigars, and the like) burn tobacco during use to produce tobacco smoke. Attempts are made to replace these tobacco-burning products by manufacturing products that release compounds without burning tobacco.

An example of this type of products is an electronic vaporization device that releases compounds by heating rather than burning materials. For example, the materials may be tobacco or another non-tobacco product, where the non-tobacco products may or may not include nicotine. As another example, there are aerosol-providing products, for example, e-cigarette devices. The devices usually include a liquid substrate, and a vaporization assembly; and the liquid substrate is vaporized by the vaporization assembly to produce an inhalable vapor or aerosol. The existing electronic vaporization device cannot prevent the transfer of the liquid substrate to the vaporization assembly prior to use by users.

SUMMARY

An embodiment of this application provides a vaporizer, configured to vaporize a liquid substrate to generate an aerosol, and including:

- a liquid storage cavity, configured to store a liquid substrate;
- a vaporization assembly, configured to vaporize the liquid substrate to generate an aerosol;
- a liquid channel, configured to provide a flowing path for the liquid substrate in the liquid storage cavity to flow to the vaporization assembly; and
- a seal element, including a blocking portion configured to seal the liquid channel and at least one weak region, where the at least one weak region is constructed to be ruptured or broken, thereby releasing the seal of the liquid channel.

Before use of the vaporizer, the liquid channel is sealed by the seal element to prevent the liquid substrate from being provided to the vaporization assembly; and in use, the liquid channel is unblocked by rupturing or breaking the weak region of the seal element.

In a preferred implementation, the blocking portion is constructed to be come off or fallen off from the seal element in response to the rupture or breaking of the at least one weak region, to release the seal of the liquid channel.

In a preferred implementation, the at least one weak region is constructed to at least partially surround the blocking portion.

In a preferred embodiment, the at least one weak region has a thickness less than another part of the seal element.

In a preferred implementation, the at least one weak region is defined by a groove formed on the seal element.

In a preferred implementation, the vaporizer further includes a support, where the seal element is supported by the support and is at least partially positioned between the support and the liquid storage cavity.

In a preferred implementation, the liquid channel includes a liquid guide hole formed in the support, and the blocking portion is configured to seal the liquid channel by blocking the liquid guide hole.

In a preferred implementation, the seal element has a first position and a second position different from the first position. The blocking portion is configured to seal the liquid channel at the first position, and the at least one weak region is ruptured or broken at the second position, thereby releasing the seal of the liquid channel by the blocking portion.

In a preferred implementation, the seal element is configured to provide a seal between the liquid storage cavity and the support at both the first position and the second position.

In a preferred implementation, the vaporizer further includes a limiting structure, configured to provide a limit to the seal element at the first position and the second position.

In a preferred implementation, the vaporizer further includes a squeezing member, configured to squeeze the at least one weak region and/or the blocking portion, so that the at least one weak region is ruptured or broken when being squeezed.

In a preferred implementation, the squeezing member is constructed to extend at least partially in a longitudinal direction of the vaporizer within the liquid storage cavity.

In a preferred implementation, the squeezing member has a free end located in the liquid storage cavity, and is configured to squeeze the at least one weak region and/or the blocking portion through the free end.

In a preferred implementation, the free end is at least partially constructed into a spike or a tip.

In a preferred implementation, the vaporizer further includes a vapor-gas output tube, configured to output the aerosol, where the squeezing member is connected to the vapor-gas output tube.

In a preferred implementation, the squeezing member at least partially surrounds the vapor-gas output tube.

In a preferred implementation, the squeezing member is constructed to move relative to the seal element in a longitudinal direction of the vaporizer, and squeeze the at least one weak region and/or the blocking portion during the movement.

Another embodiment of this application further provides a vaporizer, configured to vaporize a liquid substrate to generate an aerosol, and including:

a liquid storage cavity, configured to store a liquid substrate;

a vaporization assembly, configured to vaporize the liquid substrate to generate an aerosol;

a liquid channel, configured to provide a flowing path for the liquid substrate in the liquid storage cavity to flow to the vaporization assembly; and a flexible seal element, having a first position and a second position different from the first position, where the seal element is configured to seal the liquid channel at the first position; and at least part of the seal element is ruptured or broken at the second position, thereby unblocking the liquid channel.

According to the vaporizer, the flexible seal element can be placed in the first position to seal the liquid channel during assembly and operated to the second position during use to at least partially rupture or break the liquid channel to release the seal.

In a preferred implementation, the vaporizer further includes a squeezing member, configured to squeeze the seal element at the second position, so that the at least part of the seal element is ruptured or broken when being squeezed.

An embodiment of this application further provides an electronic vaporization device, including a vaporizer configured to vaporize a liquid substrate to generate an aerosol, and a power supply mechanism configured to supply power to the vaporizer. The vaporizer includes the vaporizer described above.

Another embodiment of this application further provides a seal element for a vaporizer, including a blocking portion configured to provide a seal, and at least one weak region, where the at least one weak region is constructed to be ruptured or broken, thereby releasing the seal of the blocking portion.

BRIEF DESCRIPTION OF THE DRAWINGS

One or more embodiments are exemplarily described with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

For ease of understanding of this application, this application is described below in more detail with reference to the accompanying drawings and specific implementations.

Figure 1:
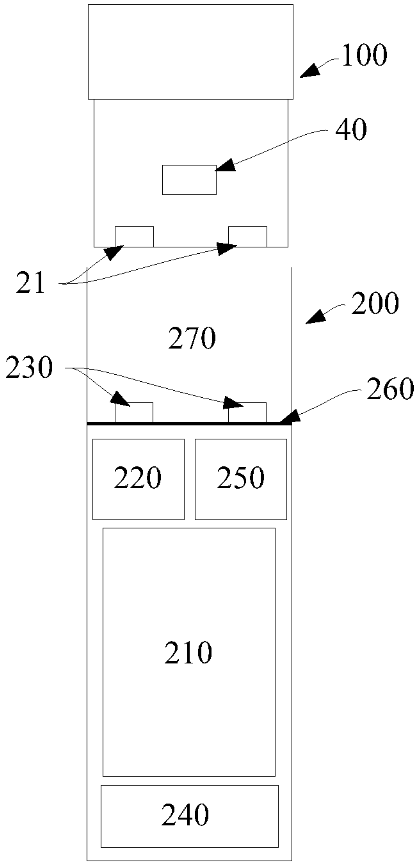
FIG. 1 is a schematic structural diagram of an electronic vaporization device according to an embodiment of this application.

An embodiment of this application provides an electronic vaporization device. Referring to FIG. 1, the electronic vaporization device includes: a vaporizer 100 configured to store a liquid substrate and vaporize the liquid substrate to generate an aerosol, and a power supply mechanism 200 configured to supply power to the vaporizer 100.

In an optional implementation, as shown in FIG. 1, the power supply mechanism 200 includes a receiving cavity 270, arranged at an end in a length direction and configured to receive and accommodate at least a part of the vaporizer 100; and first electrical contacts 230, at least partially exposed on a surface of the receiving cavity 270, and configured to be electrically connected to the vaporizer 100 to supply power to the vaporizer 100 when at least a part of the vaporizer 100 is received and accommodated in the power supply mechanism 200.

According to a preferred implementation shown in FIG. 1, a second electrical contact 21 is arranged on an end portion of the vaporizer 100 opposite to the power supply mechanism 200 in the length direction, so that when the at least part of the vaporizer 100 is received in the receiving cavity 270, the second electrical contact 21 is in contact with and abuts against the first electrical contact 230 to form an electrical connection.

A seal element 260 is arranged in the power supply mechanism 200, and at least part of an internal space of the power supply mechanism 200 is separated by the seal element 260 to form the receiving cavity 270. In the preferred implementation shown in FIG. 1, the seal element 260 is configured to extend along a cross section direction of the power supply mechanism 200, and is preferably prepared by a flexible material such as silica gel, so as to prevent the liquid substrate seeping from the vaporizer 100 to the receiving cavity 270 from flowing to a controller 220, a sensor 250, and other components inside the power supply mechanism 200.

In the preferred implementation shown in FIG. 1, the power supply mechanism 200 further includes a core 210 close to another end opposite to the receiving cavity 270 in the length direction for supplying power; and a controller 220, arranged between the core 210 and an accommodating cavity, where the controller 220 operably guiding a current between the core 210 and the first electrical contact 230.

In use, the power supply mechanism 200 includes a sensor 250. The sensor 250 is configured to sense an inhalation flow generated by the vaporizer 100 during inhalation, so that the controller 220 controls the core 210 to output a current to the vaporizer 100 according to a detection signal of the sensor 250.

Further, in the preferred implementation shown in FIG. 1, a charging interface 240 is arranged on another end of the power supply mechanism 200 facing away from the receiving cavity 270, and the charging interface 240 is configured to supply power to the core 210.

Figure 2:
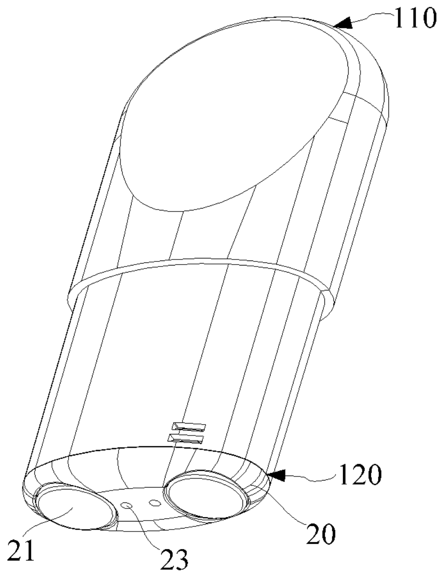
FIG. 2 is a schematic structural diagram of an embodiment of a vaporizer in FIG. 1.
Figure 3:
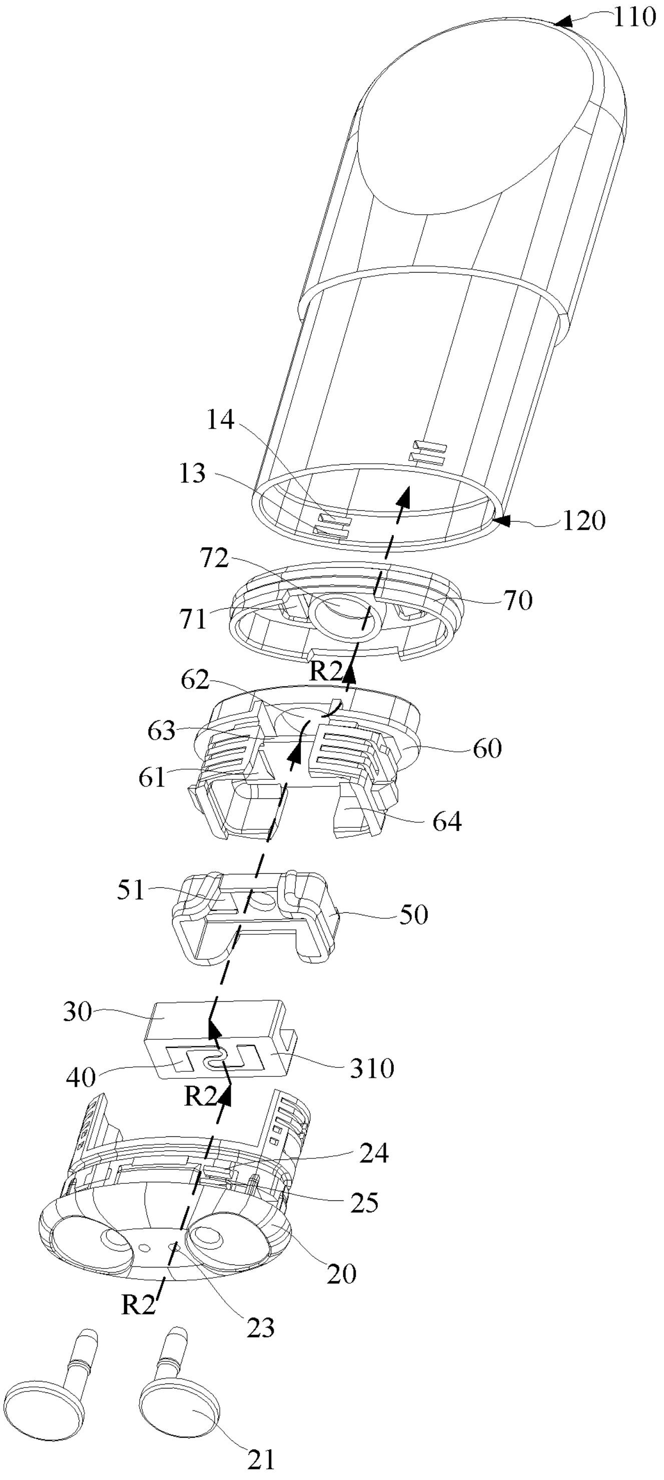
FIG. 3 is a schematic exploded diagram of the vaporizer in FIG. 2 from a perspective.

Embodiments in FIG. 2 and FIG. 3 are schematic structural diagrams of an embodiment of the vaporizer 100 in FIG. 1. The vaporizer includes:

a main housing 10, where the main housing 10 is generally in a flat cylindrical shape according to FIG. 2 and FIG. 3. The main housing 10 has a proximal end 110 and a distal end 120 opposite to each other in a length direction. According to requirements for common use, the proximal end 110 is configured as an end for a user to inhale the aerosol, and a suction nozzle A for the user to inhale is arranged at the proximal end 110; and the distal end 120 is used as an end combined with the power supply mechanism 200, and the distal end 120 of the main housing 10 is an opening on which a detachable end cap 20 is installed. The opening structure is configured to install necessary functional components inside the main housing 10.

Figure 4:
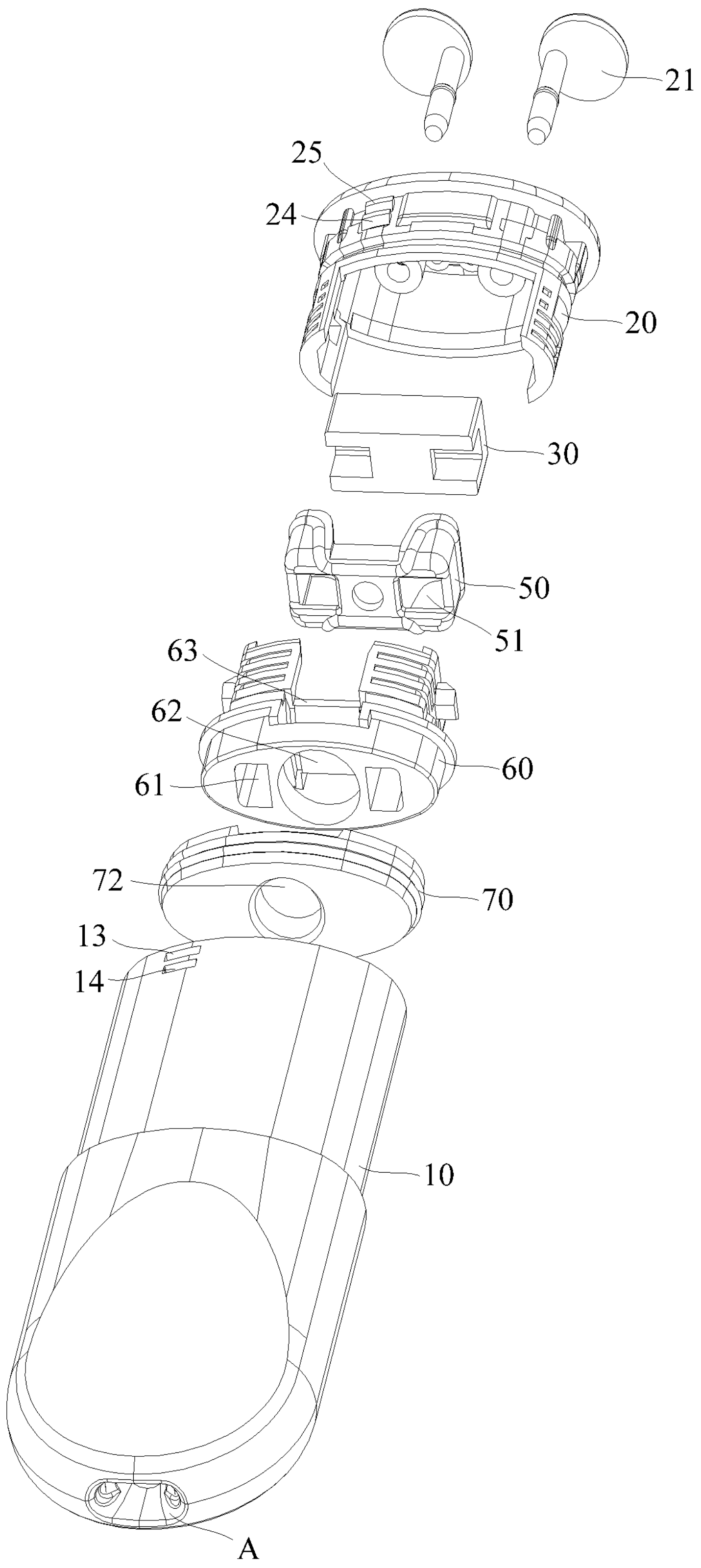
FIG. 4 is a schematic exploded diagram of the vaporizer in FIG. 2 from another perspective.

Further, in a specific implementation shown in FIG. 2 to FIG. 4, the second electrical contact 21 penetrates the vaporizer 100 from a surface of the end cap 20, so that at least part of the second electrical contact is exposed outside the vaporizer 100, so as to form conductivity through being in contact with the first electrical contact 230. In addition, the end cap 20 is further provided with an air inlet 23, configured to supply external air into the vaporizer 100 during inhalation.

Further referring to FIG. 3, FIG. 4, FIG. 9, and FIG. 10, the main housing 10 is internally provided with a liquid storage cavity 12 for storing the liquid substrate, and a vaporization assembly for absorbing the liquid substrate from the liquid storage cavity 12, and heating and vaporizing the liquid substrate. The vaporization assembly generally includes a capillary liquid guide element for absorbing the liquid substrate, and a heating element combined with the liquid guide element. The heating element heats at least part of the liquid substrate in the liquid guide element to generate the aerosol during power on. In an optional implementation, the liquid guide element includes flexible fibers such as cotton fibers, non-woven fabrics, and glass fiber ropes, or includes porous materials with a microporous structure, such as porous ceramics. The heating element can be combined onto the liquid guide element or wound on the liquid guide element through printing, deposition, sintering, physical assembly, or the like.

Figure 9:
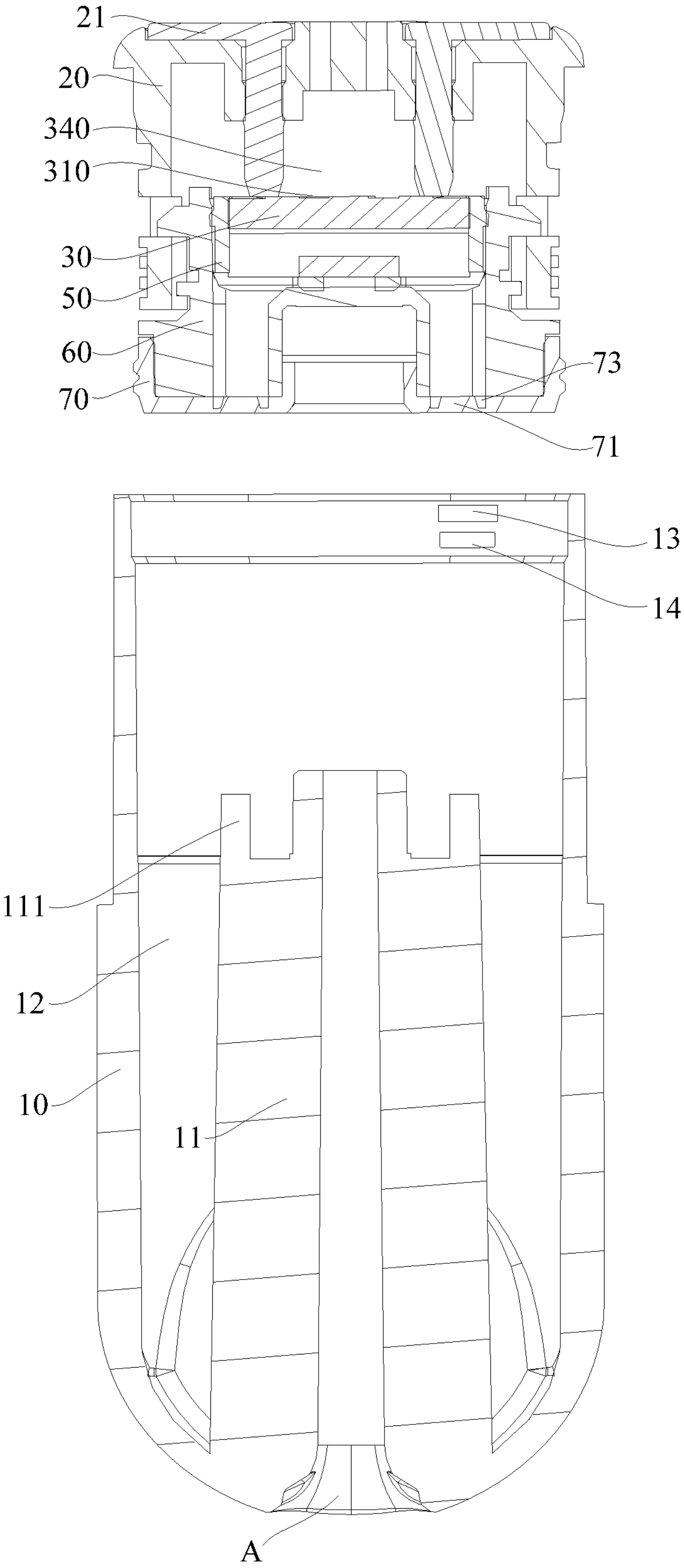
FIG. 9 is a schematic cross-sectional view of a main housing of a vaporizer in FIG. 5 before assembly.
Figure 10:
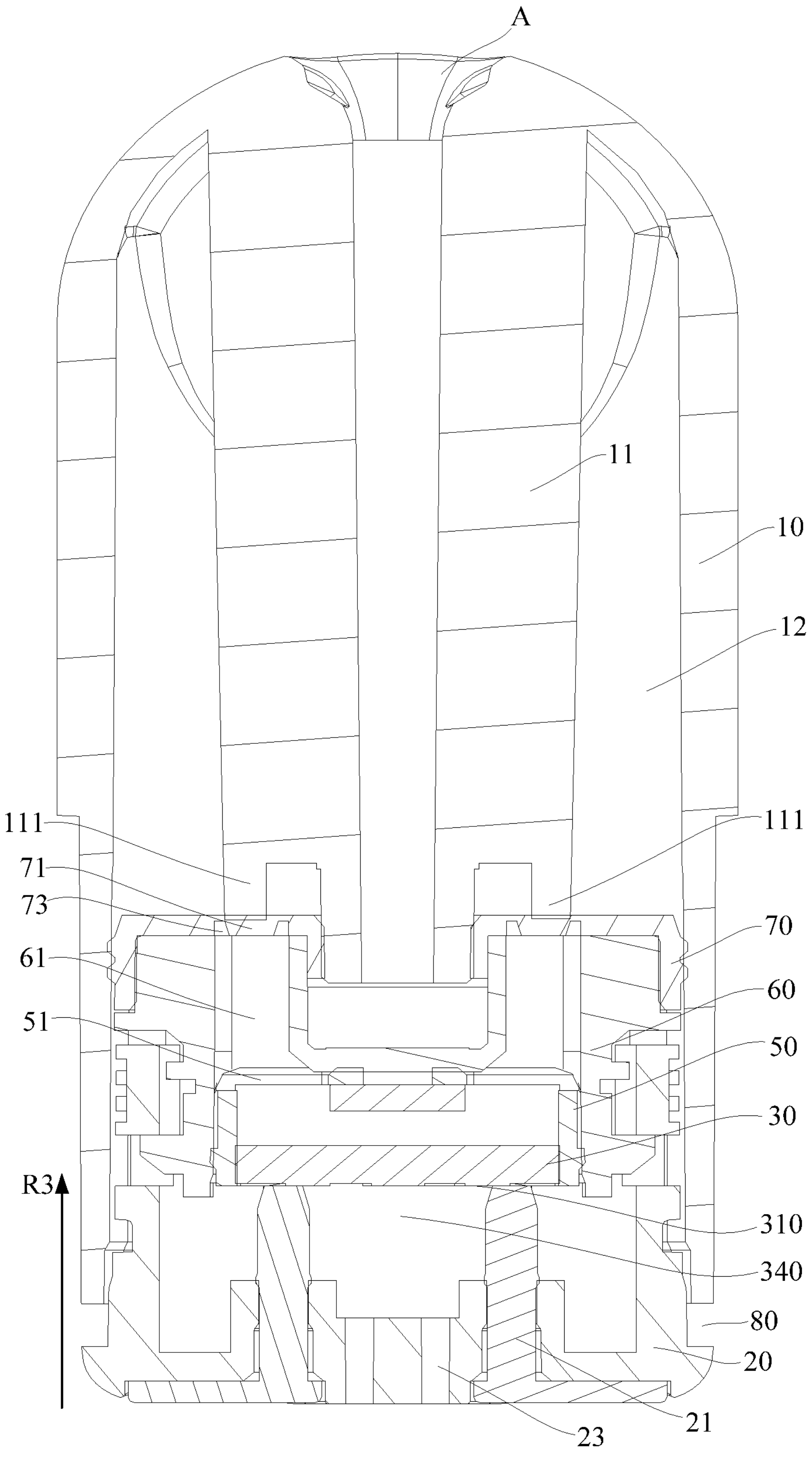
FIG. 10 is a schematic cross-sectional view of a main housing of the vaporizer in FIG. 5 at a first assembly position.

Further, in a preferred implementation shown in FIG. 3 and FIG. 4, the vaporization assembly includes: a porous body 30, configured to absorb and transfer the liquid substrate; and a heating element 40 configured to heat and vaporize the liquid substrate absorbed by the porous body 30. Specifically:

in the schematic structural cross-sectional view shown in FIG. 9 and FIG. 10, the main housing 10 is internally provided with a vapor-gas output tube 11 arranged along an axial direction; and the main housing 10 is further internally provided with a liquid storage cavity 12 configured to store the liquid substrate. In the implementation, at least part of the vapor-gas output tube 11 extends in the liquid storage cavity 12, and the liquid storage cavity 12 is formed by the space between the vapor-gas output tube 11 and an inner wall of the main housing 10. A first end of the flue gas transmission pipe 11 opposite to the proximal end 110 is in communication with the suction nozzle A, and a second end opposite to the distal end 120 is in airflow connection with a vaporization chamber 340 formed by defining between a vaporization surface 310 of the porous body 30 and the end cap 20, so as to transmit the aerosol generated by the vaporized liquid substrate in the heating element 40 and released to the vaporization chamber 340 to the suction nozzle A for inhalation.

Referring to a structure of the porous body 30 shown in FIG. 3, FIG. 4, and FIG. 9, a shape of the porous body 30 is configured to be substantially, but not limited to, a block structure in this embodiment. According to a preferred design of this embodiment, an arch shape is included, and the specific structure can be described in the application CN212590248U. In a general functional configuration, the porous body 30 has a vaporization surface 310 facing the end cap 20 in the axial direction of the main housing 10. In use, a side of the porous body 30 facing away from the vaporization surface 310 is in fluid communication with the liquid storage cavity 12, so as to absorb the liquid substrate, then the microporous structure inside the porous body 30 transmits the liquid substrate to the vaporization surface 310 to be vaporized to form the aerosol, and the formed aerosol is released from the vaporization surface 310 to the vaporization chamber 340 defined between the vaporization surface 310 and the end cap 20.

Certainly, the heating element 40 is formed on the vaporization surface 310. After assembly, the second electrical contact 21 abuts against the heating element 40, so as to supply power to the heating element 40.

Figure 5:
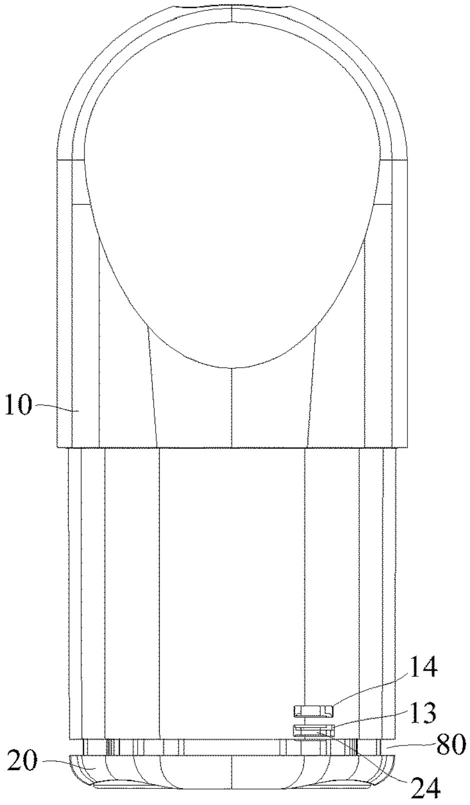
FIG. 5 is a schematic diagram of the vaporizer in FIG. 2 in a first state.

Further, referring to FIG. 3 to FIG. 5, in order to assist in the installation and fixation of the porous body 30 and the sealing of the liquid storage cavity 12, the main housing 10 is further provided with a flexible seal element 50, a support 60 and a flexible seal element 70, which not only seals an opening of the liquid storage cavity 12, but also fixes and holds the porous body 30 inside.

For the specific structure and shape, the flexible seal sleeve 50 is generally in a hollow cylinder shape. The inner hollow is configured to accommodate the porous body 30, and is sleeved outside the porous body 30 in a close-fitting manner.

The rigid support 60 holds the porous body 30 sleeved with the flexible seal sleeve 50. In some embodiments, the rigid support 60 may generally have an annular shape with an open lower end, and a holding space 64 is arranged. The holding space 64 is configured to accommodate and hold the flexible seal sleeve 50 and the porous body 30. On one hand, the flexible seal sleeve 50 can seal a gap between the porous body 30 and the support 60 to prevent the liquid substrate from seeping out of the gap between the porous body and the support frame. On the other hand, the flexible seal sleeve 50 is located between the porous body 30 and the support 60, which is advantageous for the porous body 30 to be stably accommodated in the support 60 to avoid from loosening.

The flexible seal element 70 is arranged between the liquid storage cavity 12 and the support 60, and the shape of the flexible seal element is adapted to the cross section of the inner contour of the main housing 10, so as to seal the liquid storage cavity 12 and prevent the liquid substrate from leaking out of the liquid storage cavity 12. Further, in order to prevent the shrinkage and deformation of the flexible seal element 70 made of the flexible materials from affecting the tightness of the sealing, the holder 60 is accommodated in the flexible seal element 70 to provide support for the flexible seal element.

On an aerosol output path during the inhalation process, referring to FIG. 3 to FIG. 4, the flexible seal element 70 is provided with a first insertion hole 72 for a lower end of the vapor-gas output tube 11 to plug in, the support 60 is correspondingly provided with a second insertion hole 62, and an opposite side of the support 60 to the main housing 10 is provided with an aerosol output channel 63 through which the vaporization surface 310 is in airflow communication with the second insertion hole 62. A complete inhalation flow path after installation is shown by arrow R2 in FIG. 3. The external air enters the vaporization chamber 340 via the first air inlet 23 on the end cap 20, then carries the generated aerosol to flow from the aerosol output channel 63 to the second insertion hole 62, and then outputs to the vapor-gas output tube 11 via the first insertion hole 72.

Figure 11:
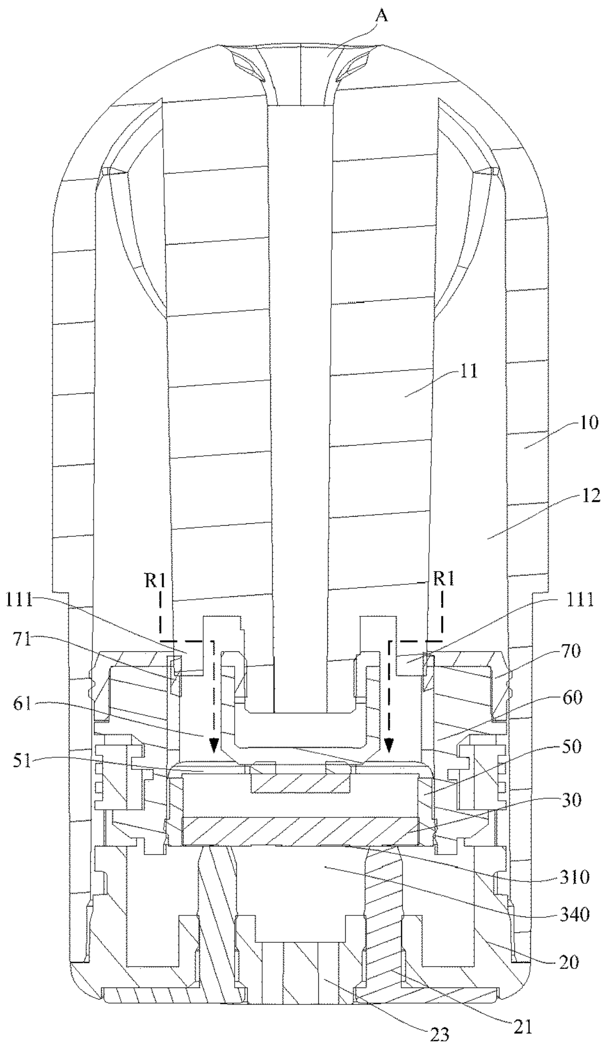
FIG. 11 is a schematic cross-sectional view of a main housing of the vaporizer in FIG. 5 at a second assembly position.

On the transmission path of the liquid substrate, specifically, as shown in FIG. 3, FIG. 4, and FIG. 11, a second liquid guide hole 61 that flows to the holding space 64 in the liquid storage cavity 12 is arranged on the support 60. A third liquid guide hole 51 opposite to the second liquid guide hole 61 is further arranged on the flexible seal sleeve 50, so that the liquid substrate can be transmitted to a surface of the porous body 30 through the third liquid guide hole 51 to be absorbed, as shown by arrow R1 in FIG. 11.

Figure 6:
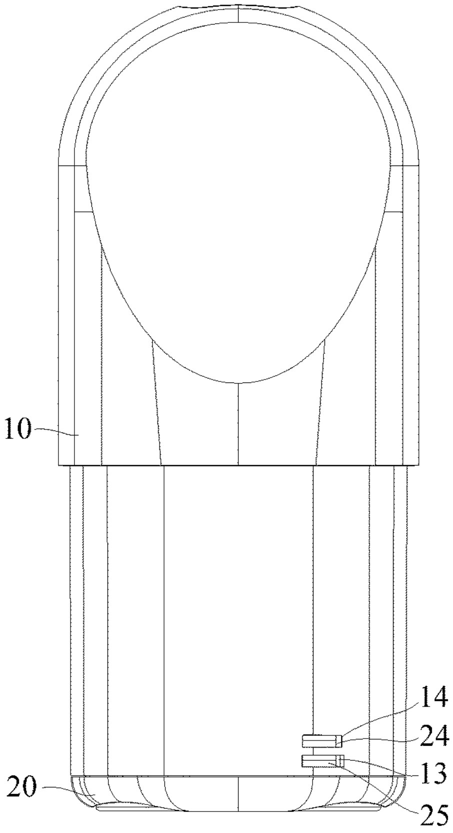
FIG. 6 is a schematic diagram of the vaporizer in FIG. 2 in a second state.

Further, in order to prevent leakage of the liquid substrate in the liquid storage cavity 12 of the vaporizer 100 before being used by the user, in still another preferred embodiment of this application, referring to FIG. 5 to FIG. 11, the main housing 10 and the end cap 20 after liquid injection in the vaporizer 100 have a first assembly position shown in FIG. 5/FIG. 10 and a second assembly position shown in FIG. 6/FIG. 11. At the first assembly position, the liquid storage cavity 12 and the second liquid guide hole 61 are isolated or sealed, and at the second assembly position, the liquid storage cavity 12 and the second liquid guide hole 61 are unblocked.

Referring to FIG. 3 and FIG. 4 structurally, the main housing 10 and the end cap 20 are provided with limiting structures that are engaged with each other, and is configured to provide a limit to the flexible seal element 70 at the first assembly position and the second assembly position during the assembly process. During specific implementation, the limiting structure includes: a first engagement groove 13 and a second engagement groove 14.

Specifically, the main housing 10 has the first engagement groove 13 and the second engagement groove 14 arranged in sequence in the longitudinal direction. The first engagement groove 13 is close to the distal end 120 of the main housing 10. The end cap 20 has a first snap 24 and a second snap 25 arranged in sequence in the longitudinal direction.

When the main housing 10 and the end cap 20 are in the first assembly position shown in FIG. 5/FIG. 10, the first snap 24 on the end cap 20 forms an engagement with the first engagement groove 13; and the second engagement groove 14 and the second snap 25 are in a non-engagement state. In this case, as can be seen from the figure, a distance 80 still exists between the end cap 20 and the main housing 10 in the first assembly position, which is not completely tightly combined. Further, in accordance with the arrow R3 in FIG. 10, the end cap 20 is further pressed against the main housing 10, the first snap 24 of the end cap 20 is further snapped into the second engagement groove 14 of the main housing 10, the second snap 25 of the end cap 20 is snapped into the first engagement groove 13 of the main housing 10, and the end cap 20 is closely combined with the main housing 10 to form the second assembly position shown in FIG. 6 and FIG. 11.

Figure 8:
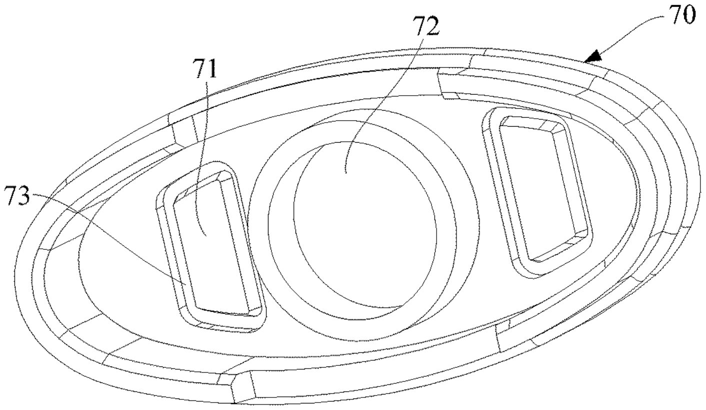
FIG. 8 is a schematic diagram of a seal element in FIG. 3 from another perspective.

Further, in conjunction with the above different assembly positions, the vaporizer 100 has a configuration in which the liquid storage cavity 12 is brought into communication or not in conjunction with the above operations. Specifically, the flexible seal element 70 for sealing the liquid storage cavity 12 is provided with:

- a blocking portion 71, opposite to the second liquid guide hole 61, where the blocking portion blocks or seals the second liquid guide hole 61, thereby preventing the liquid substrate in the liquid storage cavity 12 from flowing into the second liquid guide hole 61; and
- a rupturable weak region 73, configured to be defined by a groove around the blocking portion 71 in the preferred embodiment shown in FIG. 8, thereby allowing the rupturable weak region 73 to have a very thin thickness less than the rest of the seal element 70 to facilitate the rupture or breakage, such as a thickness of about 0.1 mm. In use, the rupturable weak region 73 may rupture to cause the blocking portion 71 to come off or fall off to bring the liquid storage cavity 12 and the second liquid guide hole 61 into communication, as shown in FIG. 11.

Figure 7:
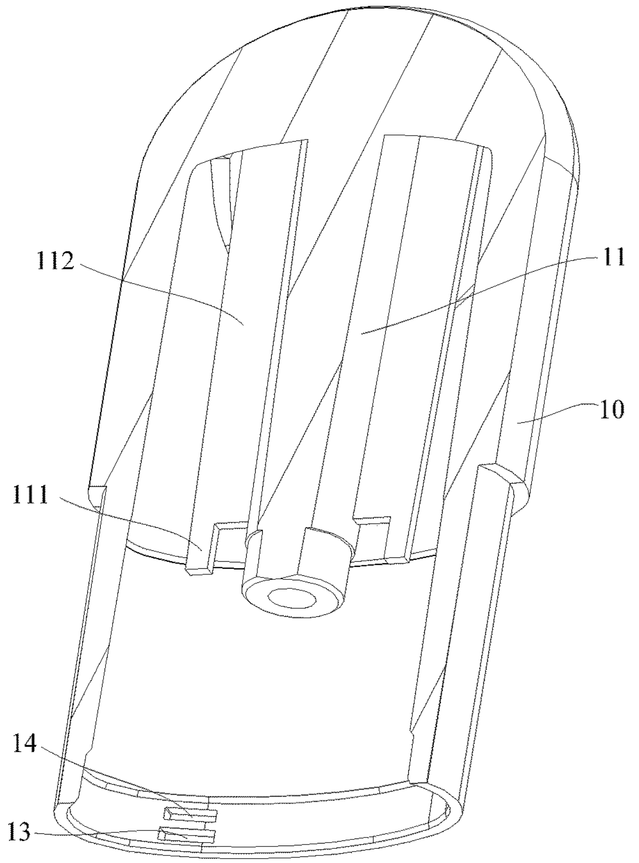
FIG. 7 is a schematic cross-sectional view of a main housing in FIG. 3 from a perspective.

Further, in order to break the rupturable weak region 73, as shown in FIG. 7 and FIG. 11, a squeezing member 112 extending longitudinally is further arranged in the main housing 10. The shape may be in a shape of a sheet or a rod, and the squeezing member has a free end facing the distal end 120, and the free end is configured to squeeze a squeezing end 111 of the blocking portion 71. The operation process of production and use, referring to FIG. 9 to FIG. 11 in sequence, includes the following.

S10: Referring to FIG. 9, the main housing 10 after the liquid injection of the liquid storage cavity 12 is completed is inverted, and then the end cap 20 fitted with the seal element 70, the support 60, and the like is pressed into an open end of the main housing 10 until the first snap 24 on the end cap 20 is engaged with the first engagement groove 13 and assembled to form the first assembly position in FIG. 10. In this case, a distance 80 still exists between the end cap 20 and the main housing 10, which is not completely tightly combined; and the blocking portion 71 of the seal element 70 abuts against the squeezing end 111, but the rupturable weak region 73 is not broken, and the liquid storage cavity 12 and the second liquid guide hole 61 of the support 60 are isolated or sealed.

S20: When the user requires to use, the end cap 20 is further pressed towards the main housing 10 as indicated by arrow R3 in FIG. 10 until the first snap 24 of the end cap 20 is snapped into the second engagement groove 14 of the main housing 10, the second snap 25 is snapped into the second engagement groove 13 of the main housing 10, and the second assembly position shown in FIG. 11 is formed. During this process, the blocking portion 71 of the seal element 70 is further squeezed by the squeezing end 111, so that the rupturable weak region 73 may rupture to cause the blocking portion 71 to come off or fall off to bring the second liquid guide hole 61 of the liquid storage cavity 12 and the support 60 into communication. The liquid substrate can flow to the porous body 30 along the arrow R1, and then be heated and vaporized to generate the aerosol for the user to inhale.

Further, as can be seen from the above description and figures, the seal element 70 provides a seal between the liquid storage cavity 12 and the support 60 in both the first assembly position and the second assembly position, preventing leakage of the liquid substrate in the gap therebetween.

Further, according to FIG. 8, in order to cause the squeezing end 111 of the squeezing member 112 have sufficient strength in squeezing the blocking portion 71, the squeezing member 112 is connected to a pipe wall of the vapor-gas output tube 11. Certainly, in a preferred implementation, the main housing 10 with the vapor-gas output tube 11 and the squeezing member 112 is prepared by molding a moldable material through a mold.

Figure 12:
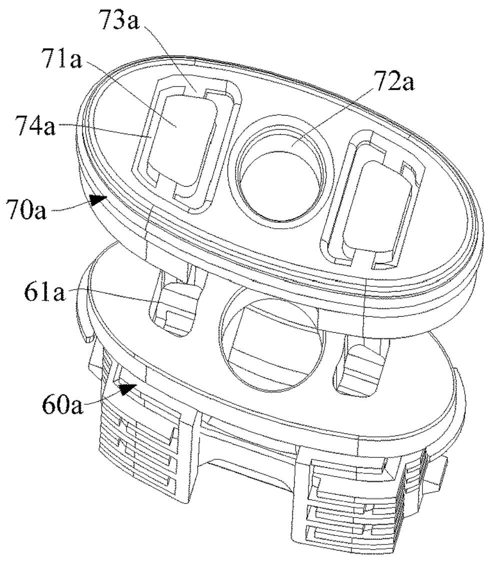
FIG. 12 is an exploded schematic diagram of a support and a seal element according to still another embodiment.

In some other optional variant embodiments, FIG. 12 shows a schematic structural diagram of a seal element 70*a* and a support 60*a* according to still another embodiment.

The support 60*a* has a second liquid guide hole 61*a*, and is configured for the liquid substrate in the liquid storage cavity 12 to flow to the porous body 30;

the seal element 70*a* has a first liquid guide hole 74*a* opposite to the second liquid guide hole 61*a*, and a blocking portion 71*a* located in the first liquid guide hole 74*a*; and the blocking portion 71*a* is connected or held in the first liquid guide hole 74*a* through the rupturable weak region 73*a*. After assembly, the blocking portion 71*a* blocks or seals the second liquid guide hole 61*a*; and when the squeezing end 111 of the squeezing member 112 squeezes the blocking portion 71*a*, the rupturable weak region 73*a* can be broken, and the blocking portion 71*a* can be come off or fallen off, thereby turning on the second liquid guide hole 61*a*.

In addition to the seal element 70/70*a* described above, an expandable slit or notch may also be used to form a weak region, which is enlarged when the squeezing end 111 of the squeezing member 112 is squeezed, thereby unblocking the liquid storage cavity 12 and the second liquid guide hole 61/61*a*.

Figure 13:
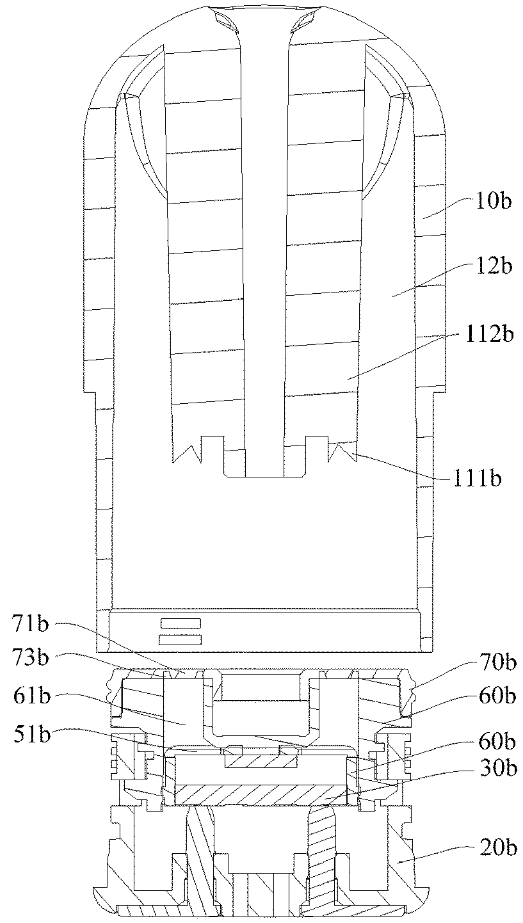
FIG. 13 is a schematic structural diagram of a vaporizer according to still another embodiment.
Figure 14:
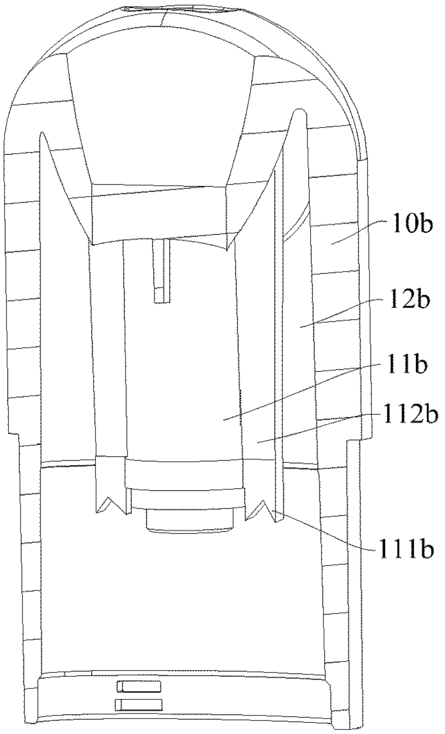
FIG. 14 is a schematic cross-sectional view of a main housing in FIG. 13 from a perspective.

FIG. 13 and FIG. 14 show schematic structural diagrams of a vaporizer according to another embodiment. A squeezing member 112*b* is integrally formed on the vapor-gas output tube 11*b* of the main housing 10*b*. A squeezing end 111*b* of the squeezing member 112*b* is constructed in a shape of a spike or a tip to facilitate easy puncturing or breakage of the rupturable weak region 73*b* of the seal element 70/70*b* during squeezing. Certainly, according to FIG. 13, the squeezing end 111*b* of the spike or tip is opposite to the rupturable weak region 73*b* in position. During operation, the squeezing end 111*b* abuts against the rupturable weak region 73*b* and is squeezed so that the squeezing end is punctured or broken.

Figure 15:
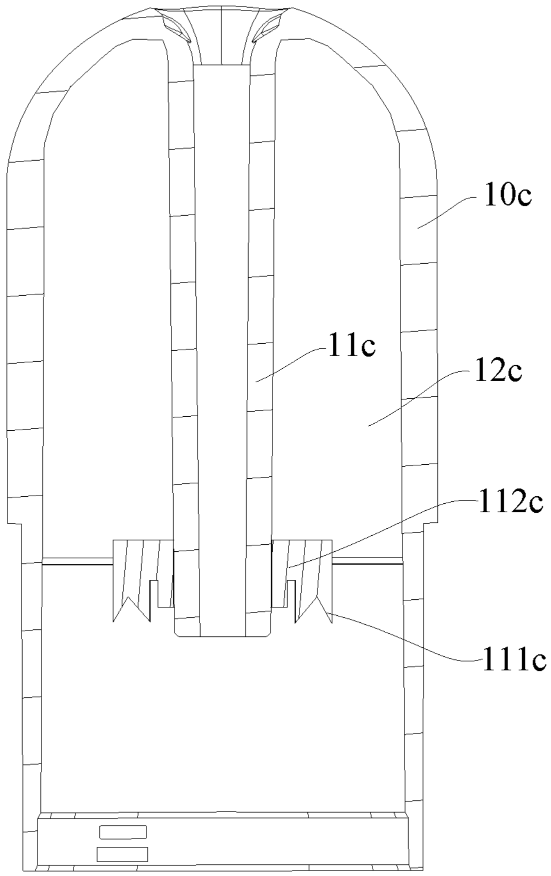
FIG. 15 is a schematic diagram of a squeezing member arranged on a main housing according to still another embodiment.
Figure 16:
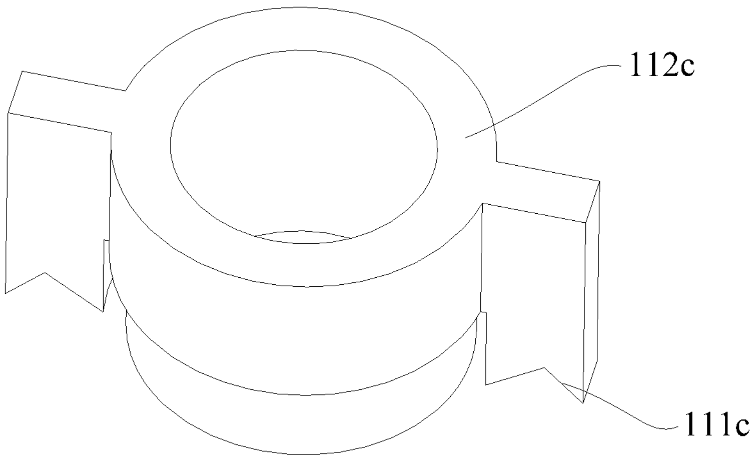
FIG. 16 is a schematic diagram of a squeezing member in FIG. 15 from another perspective.

FIG. 15 and FIG. 16 are schematic structural diagrams of a squeezing member 112*c* according to another embodiment. In this implementation, the squeezing member 112*c* is mainly annular in shape, and is substantially bound to a lower end of the vapor-gas output tube 11*c* by means of riveting or injection molding, or interference. The squeezing member 112*c* also has a tip-shaped or spike-shaped squeezing end 111*c*, to facilitate easy puncturing or breakage of the rupturable weak region 73/73*a* of the seal element 70/70*a* during squeezing. The squeezing member 112*c* has a small size or volume, which is advantageous for improving space and liquid storage capacity of the liquid storage cavity 12*c*.

It should be noted that, the specification and the accompanying drawings of this application provide preferred embodiments of this application, but is not limited to the embodiments described in this specification. Further, a person of ordinary skill in the art may make improvements or modifications according to the foregoing descriptions, and all the improvements and modifications shall fall within the protection scope of the appended claims of this application.

What is claimed is:

1. A vaporizer, configured to vaporize a liquid substrate to generate an aerosol, and comprising:

a liquid storage cavity, configured to store a liquid substrate;

a vaporization assembly, configured to vaporize the liquid substrate to generate an aerosol;

a liquid channel, configured to provide a flowing path for the liquid substrate in the liquid storage cavity to flow to the vaporization assembly; and a seal element, comprising a blocking portion configured to seal the liquid channel and at least one weak region, wherein the at least one weak region is constructed to be ruptured or broken, so that the blocking portion releases the seal of the liquid channel;

a squeezing member, configured to squeeze the seal element from within the liquid storage cavity.

2. The vaporizer according to claim 1, wherein the blocking portion is constructed to come off or fall off from the seal element in response to the rupture or breaking of the at least one weak region, to release the seal of the liquid channel.

3. The vaporizer according to claim 1, wherein the at least one weak region is constructed to at least partially surround the blocking portion.

4. The vaporizer according to claim 1, wherein the at least one weak region has a thickness less than another part of the seal element.

5. The vaporizer according to claim 1, wherein the at least one weak region is defined by a groove formed on the seal element.

6. The vaporizer according to claim 1, further comprising:

a support, wherein:

the seal element is supported by the support and is at least partially positioned between the support and the liquid storage cavity.

7. The vaporizer according to claim 6, wherein the liquid channel comprises a liquid guide hole formed in the support; and the blocking portion is constructed to block the liquid guide hole.

8. The vaporizer according to claim 6, wherein the seal element has a first position and a second position different from the first position;

the blocking portion is configured to seal the liquid channel at the first position; and the at least one weak region is ruptured or broken at the second position, thereby releasing the seal of the liquid channel by the blocking portion.

9. The vaporizer according to claim 8, wherein the seal element is configured to provide a seal between the liquid storage cavity and the support at both the first position and the second position.

10. The vaporizer according to claim 1, wherein the squeezing member is further configured to squeeze the at least one weak region and/or the blocking portion, so that the at least one weak region is ruptured or broken when being squeezed.

11. The vaporizer according to claim 10, wherein the squeezing member is constructed to extend at least partially in a longitudinal direction of the vaporizer within the liquid storage cavity.

12. The vaporizer according to claim 10, wherein the squeezing member has a free end located in the liquid storage cavity, and is configured to squeeze the at least one weak region and/or the blocking portion through the free end.

13. The vaporizer according to claim 12, wherein the free end is at least partially constructed into a spike or a tip.

14. The vaporizer according to claim 10, further comprising:

a vapor-gas output tube, configured to output the aerosol, wherein:

the squeezing member is connected to the vapor-gas output tube.

15. The vaporizer according to claim 14, wherein the squeezing member at least partially surrounds the vapor-gas output tube.

16. The vaporizer according to claim 10, wherein the squeezing member is constructed to move relative to the seal element in a longitudinal direction of the vaporizer, and squeeze the at least one weak region and/or the blocking portion during the movement.

17. A vaporizer, configured to vaporize a liquid substrate to generate an aerosol, and comprising:

a liquid storage cavity, configured to store a liquid substrate;

a vaporization assembly, configured to vaporize the liquid substrate to generate an aerosol;

a liquid channel, configured to provide a flowing path for the liquid substrate in the liquid storage cavity to flow to the vaporization assembly;

a squeezing member, configured to squeeze the seal element from within the liquid storage cavity; and a flexible seal element, having a first position and a second position different from the first position, wherein:

the seal element is configured to seal the liquid channel at the first position; and at least part of the seal element is ruptured or broken at the second position, thereby releasing the seal of the liquid channel.

18. The vaporizer according to claim 17, further comprising:

a squeezing member, configured to squeeze the seal element at the second position, so that the at least part of the seal element is ruptured or broken when being squeezed.

19. An electronic vaporization device, comprising a vaporizer configured to vaporize a liquid substrate to generate an aerosol, and a power supply mechanism configured to supply power to the vaporizer, wherein the vaporizer comprises the vaporizer according to claim 1.

* * * * *